April 28, 1953
J. B. McDONALD ET AL
2,636,270
LOAD CALCULATING DEVICE
Filed Feb. 5, 1951
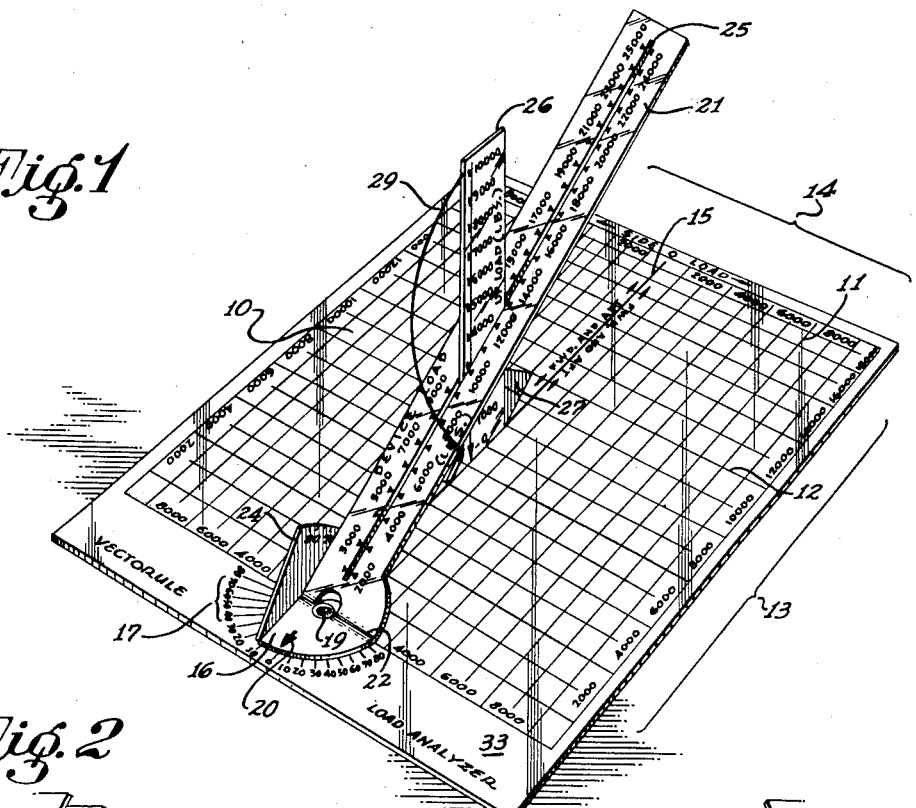
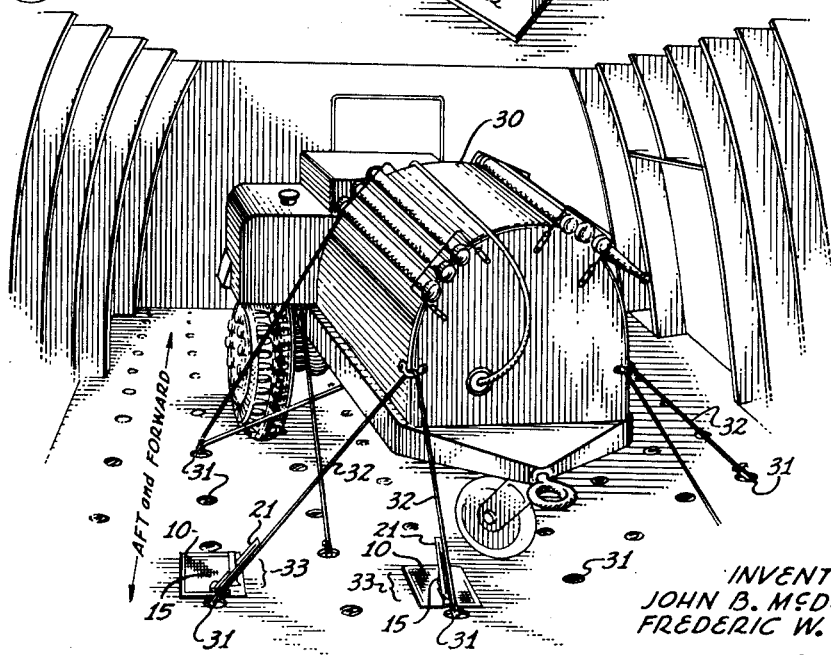
INVENTORS:
JOHN B. McDONALD
FREDERIC W. MAZY
By Herbert E. Metcalf
THEIR PATENT ATTORNEY Patented Apr. 28, 1953

2,636,270

UNITED STATES PATENT OFFICE 2,636,270

LOAD CALCULATING DEVICE

John B. McDonald, Palos Verdes, and Frederic W. Mazy, Alhambra, Calif., assignors to Northrop Aircraft, Inc., Hawthorne, Calif., a corporation of California Application February 5, 1951, Serial No. 209,342

1 Claim. (Cl. 33—1)

This invention relates to load calculating devices, and, more specifically, a load calculating device particularly suitable for computing load forces such as are exerted upon cargo tie-down fittings and restraining devices during flight.

The loads exerted upon devices used to tie down and secure cargo on cargo carrying aircraft are known as component loads and are in effect during substantially all conditions of flight.

Aircraft cargo must be secured and restrained in the cargo compartment of an aircraft bearing in mind that abnormal forces are exerted upon the tie-down apparatus during practically all conditions of flight. Great care, therefore, must be exercised in the selection of tie-down fittings and gear. The load limits of each individual fitting, with regard to the floor structure in which they are usually mounted, is normally recorded in the operating manual of the aircraft in addition to being legibly marked adjacent the fittings which are usually dispersed around the entire floor of the aircraft cargo compartment.

The angle of the tie-down gear with respect to the floor is also important in relation to the center of gravity, as well as the forces in effect from the fore and aft side and up directions, particularly in rolling stock, and where the cargo weight is known. It is, therefore, very important that the maximum anticipated forces be computed within reasonable limits so that the proper tie-down fittings and gear can be applied in quantity and location.

One object of the present invention is to provide a novel load calculating device for computing the component loads which will be exerted upon a tie-down fitting mounted in the floor of an airplane and secured to cargo to restrain the cargo from shifting its position during flight.

Another object of the present invention is to provide a device of economical construction which will quickly and simply compute component loads as exerted upon tie-down devices within the margin of safety allowed.

Other objects and advantages of this invention, which will be useful in other applications, will become apparent as this specification continues.

Briefly, the present invention preferably utilizes a rectangular flat base scale, a protractor connected to the base scale and rotatable thereon to measure lateral angles, a longitudinal medial scale hinged at one end to the protractor and inclinable at angles to the vertical, and a vertical scale with the basal end resting on the base scale and slidable in a prependicular position on the surface of the base scale in a longitudinal slot provided in the medial scale. The device in one form may be used to compute the component loads in advance of cargo loading or may be used during the loading operation. In the latter case, the device of this invention is placed adjacent the tie-down fitting and restraining gear, rotating the protractor to the direction followed by the tie-down device, and measuring the angle of the tie-down device with regard to the compartment floor. The scales, when set at the proper adjustment with relation to the cargo indicates the component load which will be exerted upon the tie-down fitting and gear.

In actual tests the particular embodiment of this invention herein to be described has proven to be accurate within 200 pounds reading accuracy and will compute loads up to 23,000 pounds.

The invention in the form described will be more clearly understood by referring to the accompanying drawings wherein:

Figure 1 is a perspective view of a load analyzer embodying the present invention in one preferred form.

Figure 2 is a perspective view of the interior of an aircraft cargo compartment.

Referring first to Figure 1, a base scale 10 is of somewhat rectangular form and is preferably made from resilient material, plastic for example, of a thickness in the order of .015. The surface of the base scale 10 is divided into predetermined increments by longitudinal 11 and lateral 12 lines by a printing or marking process. Each increment represents a unit of measure in one direction. The present invention relates to force factors and the longitudinal increments 11 therefore represent force in the fore and aft directions and constitute the fore and aft load scale 13. The force in the side directions are represented by the lateral 12 increments and constitute the side load scale 14. The side load scale 14 is divided into two equal elements which start on the center line 15 of the scale at "0" load and increase outwardly in opposite directions in increments of 500 pounds, side loads can thereby be computed from either side of the cargo.

A protractor 16 is pivotally fastened to the base scale 10 on the center line 15 at the "0" end of the fore and aft load scale 13. The degrees of arc 17 are printed on the base scale 10 with "0" degrees beginning on the center line 15 and continuing to 90 degrees on each side thereof. The protractor 16 is fastened to the base scale 10 with the pivot point 19 exactly as possible over the degrees of arc 17 characters and in line therewith. An indicator 20 then provides means for accurately rotating the protractor 16 to a desired angle.

A medial scale 21 of longitudinal form, calibrated and printed in predetermined increments of force and bearing the legend "Device Load" and "(Lbs.)" is connected to the protractor 16 in line with the base scale center line 15 by means of a hinge 22 and can be angularly elevated with respect to the base scale 10 thereby. Accurate angles of elevation are obtained by a segment 24 of the protractor 16 which hinges parallel to the medial scale 21 and is marked with the degrees of arc ranging from "0" degrees absolute level to 90 degrees perpendicular to the base scale 10. A longitudinal slot 25 extends axially along the length of the medial scale 21 and is adapted to slidably receive a vertical scale 26. The vertical scale 26 is calibrated and printed in predetermined increments of force and bears the legend "Up Load (Lbs.)" and is preferably made from the same material as the base 10 and medial scale 21. A hinged toe 27 at the base of the vertical scale 26 is provided to stabilize the vertical scale 26 in application. A length of nylon string 29 or twine is attached to the top and bottom ends of the vertical scale 26 so that the vertical scale 26 will not be lost or separated from the assembly when folded flat and not in use.

In Figure 2, a tank trailer 30 is shown secured in the cargo compartment of an aircraft. A number of tie-down fittings 31 in the floor of the compartment are in use, and typical restraining gear 32 is shown as applied in actual practice. For a specific example of the preferred operation of the load calculating device 33, the total restraint load of the cargo must first be determined. A number of variables determine the total restraint load such as whether the cargo is rolling stock, etc., and an arbitrary factor of (nine) 9 has been found, in the present example, to provide a substantial margin of safety. The weight of the tank trailer 30, which is known to weigh 1750 pounds, is multiplied by the factor 9 and a total restraint load of 15,750 pounds results. It is desirable in view of the total restraint load of the present example, to use two tie-down devices 32 and floor fittings 31 at each restraint point of the cargo; one set for side restraint, the other for fore and aft restraint. Inasmuch as two tie-down fittings 31 will be used, the total restraint load is divided by 2, resulting in a figure of 7875 pounds. As was pointed out earlier in the specification, each tie-down fitting 31 has a maximum load limit and it remains then, to compute the component load for each fitting. To compute the component and device loads, load analyzers 33 are shown in proper position with the central line 15 of the base scale 10 parallel to the center line of the aircraft. In each case the medial scale 21 is elevated at the same angle to the base scale 10 as the tie-down device 31 and in line therewith. The vertical scale 26 is then placed at the intersecting abscissa and ordinate of the base scale 10 at the point of the fore and aft load ordinate 13 corresponding to the fore and aft restraint load per component which was found to be 7875 pounds, in order to obtain the device or component load which will be read directly from the vertical scale 26 at the point of intersection of the medial scale 21 and the vertical scale 26. In the present example the position (not shown) of the medial scale 21, with respect to the angle of pivot and elevation, will indicate at the point of intersection with the vertical scale, an upload, on the tie-down fitting, of 6500 pounds on the vertical scale 26. The device load will be read from the medial scale 21 and indicate a device load upon the tie-down fitting of 10,400 pounds. If either of the loads obtained exceed the maximum load limit of the fitting, other fittings will have to be used to reduce the load on the fitting to be used. The side load of the example at hand, is read directly upon the coordinate 12 on the point covered by the vertical scale 26 side load scale 14 intermediate the center line 15 and the outermost limit of the scale. In the present example, the figure obtained would be 900 pounds. It can thus be seen that with the one setting of the load calculating device of the present invention, as described, it can be quickly and simply determined whether or not each fitting is within the safety range for the cargo to be secured.

The protractor 24 makes it possible to compute the component loads in advance of cargo shipments. The load calculator 33 can be used in conjunction with a floor plan of a cargo airplane wherein the floor fittings are accurately indicated. It can generally be determined at what angle the restraining device can be secured between the fitting and the cargo. The problem can therefor be solved in advance and recorded for purposes of instructions for securing the cargo. The load analyzer 33 can be positioned at every fitting 31 around the cargo, and the component load computed assuring accurate and proper securing and restraining of the cargo within the safety limits of each tie-down fitting.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claim.

What is claimed is:

A load calculating device for computing forces exerted by cargo weight upon aircraft cargo tie-down devices, comprising: a base scale, said base scale being calibrated into predetermined units, each of said units representing one thousand pounds of force exerted in a fore or aft direction, said base scale also being laterally calibrated into predetermined units, each of said units representing one thousand pounds of force exerted sidewardly in opposite directions, said base scale being equally longitudinally divided into equal portions by a center line, said center line representing "0" pounds of side force, said lateral units graduating in increments of one thousand pounds outwardly in opposite directions from said center line, a protractor pivotally connected to said base scale on said center line at one end thereof to measure lateral angles of rotation of said protractor with respect to said base scale, a longitudinal medial scale, said medial scale being laterally calibrated along the longitudinal axis thereof into predetermined units, each of said units representing one thousand pounds of force exerted upon said tie-down devices from a specified direction, said medial scale being hinged at the end thereof beginning with "0" pounds of force, to said protractor, said medial scale being inclinable with respect to said base scale to a maximum of 90 degrees thereto, said protractor having a segment thereof hinged parallel with said medial scale, said hinged segment being marked with the degrees of arc from "0" degrees to 90 degrees and adapted to be erected perpendicularly parallel to said medial scale and measure the vertical angle of incline thereof with respect to said base scale, a longitudinal vertical scale, said vertical scale being calibrated laterally along the longitudinal axis thereof into predetermined units, each of said units representing one thousand pounds of force exerted upwardly with respect to said base scale, a hinged toe element at one end of said vertical scale adjacent "0" pounds of force, said toe element being provided to stabilize said vertical scale in an upright position, a longitudinal slot in said medial scale, said slot extending from the hinged end thereof and terminating adjacent the opposite end thereof, said slot being adapted to slidably receive said vertical scale transversely therethrough, said vertical scale being longitudinally perpendicularly movable with respect to said base scale in said slot with the toed base abutting the surface of said base scale, and a length of cord, said cord being fastened at one end to one end of said vertical scale, the other end of said cord being fastened to the other end of said vertical scale, said cord being passed through said slot of said medial scale loosely joining said vertical scale thereto.

JOHN B. McDONALD.
FREDERIC W. MAZY.

References Cited in the file of this patent
UNITED STATES PATENTS

| Number | Name | Date |
|---|---|---|
| 460,930 | Cox | Oct. 6, 1891 |
| 515,497 | Morgan | Feb. 27, 1894 |
| 828,792 | White | Aug. 14, 1906 |
| 2,444,693 | Comstock | July 6, 1948 |
| 2,472,138 | Yamins et al. | June 7, 1949 |
| 2,582,080 | Stroukoff et al. | Jan. 8, 1952 |